Feb. 21, 1950 G. H. FRITZINGER 2,498,261
UNIFORM SCALE ELECTRICAL RATIO INSTRUMENT
Filed May 19, 1945
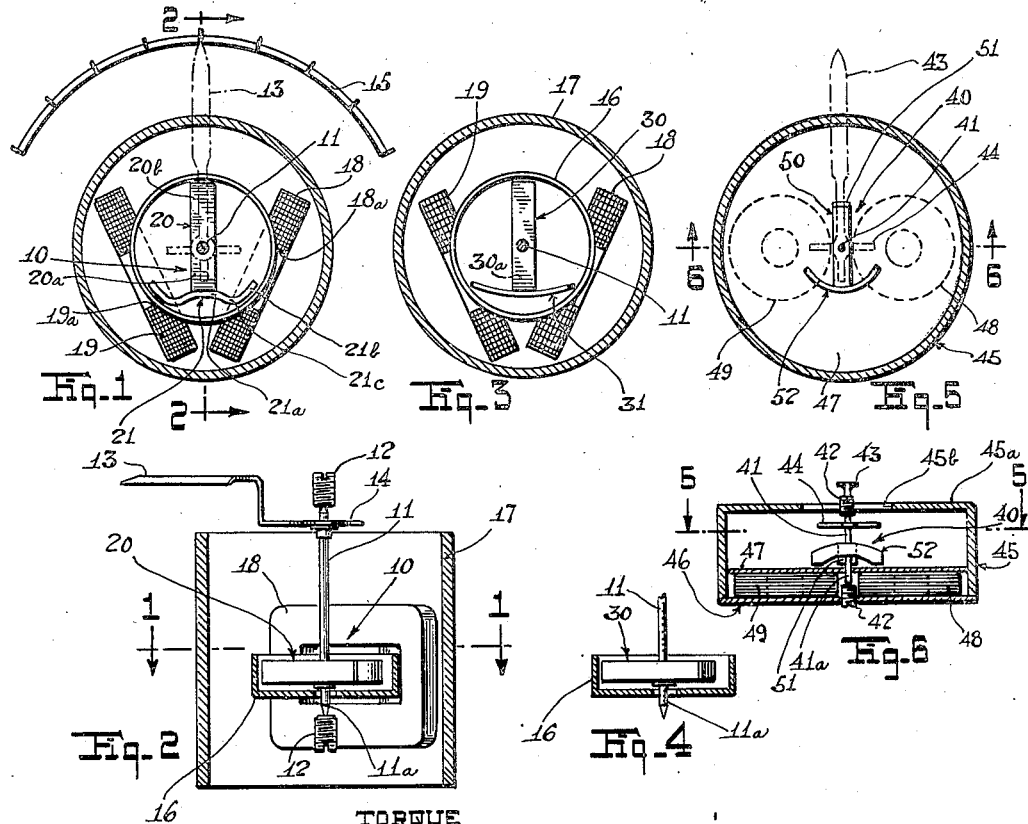
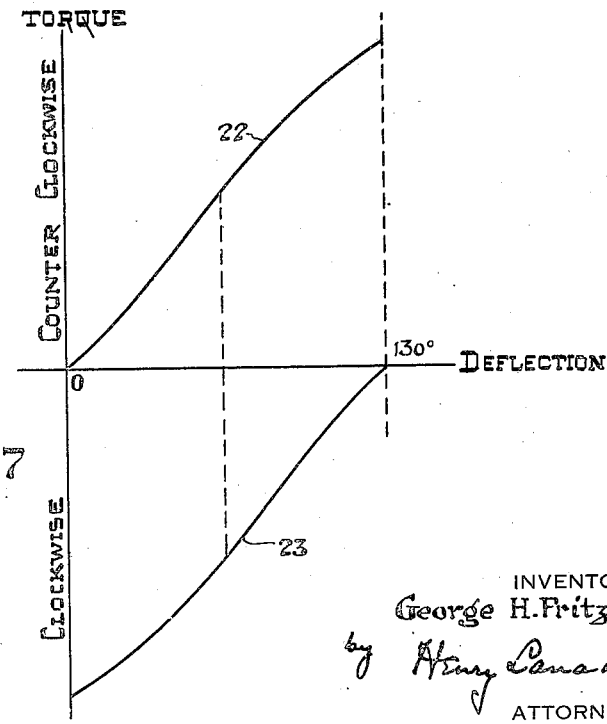
INVENTOR
George H. Fritzinger
by Henry Lanahan
ATTORNEY Patented Feb. 21, 1950

2,498,261

UNITED STATES PATENT OFFICE 2,498,261

UNIFORM SCALE ELECTRICAL RATIO INSTRUMENT

George H. Fritzinger, West Orange, N. J., assignor to Thomas A. Edison, Incorporated, West Orange, N. J., a corporation of New Jersey Application May 19, 1945, Serial No. 594,635

8 Claims. (Cl. 171—95)

This invention relates to the magnetic systems of electrical instruments and more particularly to improvements in the magnetic systems of electrical instruments of the moving magnet type. The invention has particular utility and is herein illustrated and described in connection with instruments of the character described and claimed in my U. S. Patents Nos. 2,446,579 and 2,460,686 issued August 10, 1948 and February 1, 1949 respectively.

The invention is concerned especially, although not limitatively, with permanent-magnet materials of the type which can be permanently magnetized along only one magnetic axis—this being herein referred to as the inherent or fixed magnetic axis of the material. This type of permanent-magnet material—of which "Alnico V" of the Indiana Steel Products Company is an example—will retain considerably higher stored magnetic energy than any previously known magnetic material. (The maximum energy product of flux density and demagnetizing force of this material is approximately three times that of other kinds of "Alnico.") Thus, considerably smaller amounts of this material are required than of other materials for equivalent magnetic results. Because of the higher efficiency of this material, it is admirably suited for use in electrical indicating instruments of the moving magnet type since it enables a higher driving torque to be obtained for a given rotor weight than can be obtained with other magnet materials.

In my abovementioned patents there are disclosed ratiometers embodying the principle that a permanent-magnet rotor having a wide flux field distribution at one pole and a relatively narrow field distribution at a diametrically opposite pole will, when working in association with a field coil that is offset from the pivot axis of the rotor and energized by a fixed current, be subjected to a torque that varies progressively in the same direction over a wide range of deflection of the rotor. This principle has been utilized to obtain a uniform scale distribution in such instruments. A uniform scale however requires not only that the flux fields from the poles of the rotor be substantially symmetrical with respect to the longitudinal medial plane of the rotor magnet but also that these fields be properly distributed. Variation in location of the fixed magnetic axis of the magnet will shift these fields and vary their distribution. Because of the difficulty in accurately locating this fixed axis in the fabrication of magnets of this material, it has sometimes been impractical to use these higher-energy magnet materials in such applications as abovementioned where the flux field distribution is a critical factor.

It is an object of my invention to provide a novel form of magnet construction which enables the practical use of these higher-energy magnet materials in electrical instruments while fulfilling close tolerances respecting the scale distribution, calibration, uniformity in operation, etc.

It is another object to provide a novel permanent-magnet system for indicating instruments of the moving magnet type, which is not critical to variations in the inherent magnetic characteristics of the permanent-magnet material.

It is another object to provide novel electrical instruments of the moving magnet type wherein wider tolerances in the physical dimensions of the permanent magnet are permissible.

These and other objects and features of my invention will more fully appear from the following description and the appended claims.

In the description of my invention reference is had to the accompanying drawings, of which:

Figure 1 is a fractional sectional view of a ratiometer incorporating my invention, taken substantially on the line 1—1 of Figure 2;

Figure 2 is a fractional sectional view taken substantially on the line 2—2 of Figure 1;

Figure 3 is a view similar to Figure 1 illustrating a second embodiment of my invention;

Figure 4 is a fractional sectional view showing the rotor of Figure 3 in side elevation;

Figure 5 is a view of an alternative form of ratiometer wherein my invention is incorporated, taken substantially on the line 5—5 of Figure 6;

Figure 6 is a fractional sectional view taken substantially on the line 6—6 of Figure 5; and Figure 7 is a view showing a set of typical torque deflection characteristics for the embodiment of Figures 1 and 2.

In Figures 1 and 2 there is shown a ratiometer of the type disclosed in my abovementioned Patent No. 2,446,579 wherein a preferred form of my invention is embodied. For the present purposes a detailed description of the mechanical construction of this ratiometer is unnecessary and accordingly only the main operative components less the frame are shown. (For a detailed description of a preferred form of frame construction for this intrument reference may be had to Fox Patent No. 2,439,970 issued April 20, 1948, having a common assignee with the present application.) This ratiometer comprises a permanent-magnet rotor 10 mounted on shaft elements 11 and 11a which are pivoted at the ends in jewel bearings 12. The shaft element 11 carries a pointer 13 and the usual cross-arms 14 which are for receiving balancing weights not shown. The end of the pointer overlies a scale 15 and moves thereacross as the rotor is deflected through its operative range. The rotor 10 is disposed within a hollow cylindrical damping cup 16 made for example of a highly conductive material such as copper. Spaced from this damping cup and concentric thereto is a magnetic flux return element or shield 17 of a nonpermanent high-permeable material such as "Mumetal." In the space between the shield and cup there is a pair of coils 18 and 19 mounted at angles to one another and having their magnetic axes radial to the pivot axis of the rotor. Preferably, these coils have arcuate recesses 18a and 19a received by the cup 16 so that the coils may be spaced more closely together in a V arrangement. Typically the angle between the axes of the coils may be 130°.

The rotor 10 has a wider flux field at one pole than at the other in accordance with the principle aforestated but is of a novel design adapted in particular to render it less critical to variations in the inherent magnetic characteristics of the permanent magnet as well as to variations in the physical dimensions of the magnet, a particular advantage in this rotor construction being that it permits the practical use of the magnet materials which have fixed or permanent magnetic axes. This rotor comprises a narrow bar 20 preferably of one of the higher-energy magnet materials such as "Alnico V," the magnetic axis of this magnet being lengthwise of the bar. The bar magnet is pivoted on an axis in its longitudinal medial plane—the plane through the section line 2—2 of Figure 1—and at a point offset towards one end or pole of the magnet. The term "narrow" as applied to this magnet refers to the width dimension of the magnet which is in its directions of movement and is employed in the sense of being one-third or less of the length of the magnet, a typical value being of the order of one-fourth the length. The term "thickness" refers therefore to the dimensions of the magnet at right angles to its directions of movement—i. e., in the present instance, the dimensions which are parallel to the pivot axis. When the magnet is made narrow the positioning of the magnetic axis in fabricating the magnet—which is typically done by casting—can be more accurately located; also, when the magnet is made narrow the flux field of the rotor is made less sensitive by my invention to the direction of the magnetic axis as will hereinafter appear. The thickness dimension is important principally in meeting design requirements for maximum efficiency, it being understood that in an efficient design there is required a proper ratio of length to square root of cross sectional area of the magnet.

Secured, as by soldering, to the shorter pole 20a of the magnet 20 is a pole shoe 21 of a nonpermanent high-permeable magnetic material such as soft iron. This shoe is preferably made in the form of a thin narrow strip and is preferably secured at its central portion in symmetrical relation to the magnet to the end face of the pole 20a. The shoe extends crosswise to the magnet and has a length dimension which is large relative to the width of the magnet, its length being typically at least several times the width of the magnet. By employing a wide shoe at only one pole of the magnet the useful flux field from that pole to the shield 17 is widely distributed while the field from the other pole 20b of the magnet is relatively narrowly distributed.

It will be apparent from the foregoing description that the present rotor and field coil arrangement is one which will give torque deflection characteristics which vary progressively in the same direction through a wide range of deflection of the rotor, typically a range of 130°. In order to obtain a linear scale distribution in ratiometers of the character described it is necessary, as is disclosed in my abovementioned Patent No. 2,446,579, that such torque deflection characteristics be either linear over the operating range or else have such shape that at equal deflections $d$ of the rotor in clockwise and counterclockwise directions from a midpoint of this range, the ratio of the lesser torque to the greater torque exerted on the rotor is equal substantially to $$\frac{D-d}{D+d}$$

where D is one-half the angular length of that range. To fulfill this condition it is required that the flux field from the effectively wider pole of the magnet shall be of the order of 120° in width, about the pivot axis as a center, and that that flux field shall be properly distributed. According to the present invention this desired flux field is obtained with different lengths of the bar magnet by properly shaping the shoe 21 relative to the shield 17. Typically in ratiometers of the moving magnet type, particularly when "Alnico V" is employed, rotor designs employing the longer magnets are preferable in order to utilize the magnet material to better efficiency. When the magnet is made longer relative to the internal diameter of the shield the flux radiating from its pole end faces tends to be more concentrated because of the relatively shorter spacing of the ends of the magnet from the shield. By shaping the shoe 21 so that its central portion 21a is spaced farther from the shield than are its end portions 21b, the air gap reluctance between the shoe and the shield, per unit length of the shoe, is greatest at the central portion of the shoe where the flux radiation from the magnet tends to be the more concentrated and, as a result, the flux from the pole 20a is more evenly distributed. This "reluctance" control over the distribution of the flux overpowers the effects due to variations in the location of the magnetic axis of the magnet 20 as well as effects due to variations in the physical dimensions of the magnet.

As the magnet 20 is made longer relative to the internal diameter of the shield, the difference between the spacing of the central portion of the shoe from the shield and the spacings of the end portions of the shoe from the shield must be more marked in order to give the desired flux distribution. The rotor construction of Figures 1 and 2 is of the "longer magnet" design and the shoe 21 is provided accordingly with diverging intermediate portions 21c which extend angularly from the end face of the magnet toward the shield 17 to terminate into the substantially arcuate terminal portions 21b; in other words, the shoe may be termed as being recessed at its central portion away from the shield. As a preferred design, the terminal portions 21b of the shoe are spaced from the pivot axis by the distance of the length of the longer pole 20b of the magnet, and the pole 20a of the magnet is accordingly made shorter than the pole 20b to the extent of the recessing required of the shoe.

In Figure 7 the curves 22 and 23 represent typical torque deflection characteristics between the rotor 10 and respective coils 18 and 19 for the condition of equal currents in the coils and a relative polarization of the coils such as is required for a ratiometer. These are nearly linear characteristics which satisfy the required relationship above expressed for a uniform scale distribution.

By way of example the following approximate dimensions have been used satisfactorily in the ratiometer above described, but no unnecessary limitation thereto is intended: shield 17, inside diameter $\frac{31}{32}''$; damping cup, inside diameter $\frac{17}{32}''$, wall thickness $1/64''$; coils 18 and 19, outside diameter .7'', thickness .15''; bar magnet 20, length .44'', dimension in cross section .09''; and shoe 21, length from tip to tip .42'', width .09''.

In Figures 3 and 4 there is shown an alternative embodiment of my invention wherein a shorter length of the bar magnet 30 is employed. Secured as by soldering to the end face of the shorter pole 30a of this magnet is a shoe 31 made for example of soft iron. This shoe is arcuately shaped but has a radius of curvature greater than the length of the shorter pole 30a so that the ends of the shoe will be closer to the shield 17 than is the central portion of the shoe. The more gradual variation which is here obtained along the length of the shoe and the spacing of the shoe from the shield 17 is permitted because the pole 30a is spaced farther from the shield and therefore does not tend to radiate so concentrated a field as does the pole 20a in the previous embodiment.

In Figures 5 and 6 there is shown fractionally a ratiometer of the type described and claimed in my abovementioned Patent No. 2,460,686 but wherein the rotor is modified according to the present invention. This ratiometer comprises a permanent-magnet rotor 40 provided with shaft elements 41 and 41a which pivot in jewel bearings 42. The shaft element 41 carries a pointer 43 and crossarms 44 for carrying balancing weights not shown. Surrounding the rotor is a cylindrical shield case 45 of a magnetic material such as "Armco." This case has a top wall 45a provided with a central hole 45b through which extends the pointer 43. The bottom of the case is closed by a disk 46 which is mounted at right angles to the pivot axis of the rotor and is centered at the rotor axis. This disk constitutes the main flux return element for the useful flux of the rotor and is made of a non-permanent high-permeable magnetic material such as "Mumetal." Lying parallel to the bottom disk 46 and closely adjacent the rotor 40 is a damping disk 47 of a conductive material such as copper, and interposed between the disks 46 and 47 at opposite sides of the pivot axis of the rotor are two flat coils 48 and 49 having their magnetic axes parallel to the pivot axis of the rotor.

The rotor 40 comprises a narrow bar magnet 50 mounted preferably at right angles to the shafts 41 and 41a—i. e., in parallel relation to the disks 46 and 47—and spaced above the damping disk 47. Secured as by soldering to one end face of the magnet is a shoe 51, of soft iron, which is approximately as wide as the magnet but which depends downwardly from the magnet, terminating at a suitable clearing distance from the damping disk. The flux radiation from this pole is accordingly quite narrowly distributed. Secured to the other end of the magnet in transverse relation thereto is a relatively long shoe 52, also as of soft iron, which for example may be arcuate as viewed from the top and may have typically a length of the order of 120°. The lower edge of the central portion of this shoe is at approximately the level of the bottom face of the magnet but the end portions of the shoe depend below the magnet and terminate at clearing distances from the damping disk. Thus, here again, at the center of the shoe where the flux radiation tends to be the more concentrated, the reluctance to the magnetic disk 46 is greater than it is from the end portions of the shoe with the result that the flux is distributed throughout the width of the shoe to give the desired torque deflection characteristic for a uniform scale or such other scale distribution as may be desired.

I have herein shown and described my invention in terms of certain preferred embodiments thereof but it will be understood that these embodiments are illustrative and not limitative of my invention as the same is subject to changes and modifications without departure from the scope of my invention, which I endeavor to express according to the following claims.

I claim:

1. In an electrical instrument: the combination of a bar of permanent-magnet material; a shoe of non-permanent magnetic material secured at its central portion to a pole end portion of said bar and in transverse relation to said bar; a magnetic flux return member for said bar spaced from said shoe, said shoe having a flux-radiating surface confronting said flux return member which is at shorter distances from said member at points on said surface nearer the ends thereof; means interconnecting said bar and flux return member for relative pivotal movement; and a field coil having a portion in the flux field between said bar and said return member for producing a magnetic field to exert a torque influence on the bar relative to the return member.

2. In an electrical instrument: the combination of a bar of permanent-magnet material pivoted on a transverse axis extending therethrough; a relatively stationary flux return member for said bar symmetrically shaped relative to said pivot axis; a shoe of non-permanent magnetic material secured at its central portion to a pole end portion of said bar and in transverse relation to said bar, said shoe having a length substantially greater than the width of said bar and having a flux-radiating surface confronting said flux return member which is spaced farther at its central portion from said member than at its terminal portions and a field coil having a portion interposed between said shoe and said return member and effective when energized for producing a torque influence on said bar relative to the return member.

3. The subject matter set forth in claim 2 wherein said pivot axis is offset toward the pole end of the bar to which is secured said shoe, and the ends of said shoe terminate substantially on a circle through the other pole end face of said bar and about said pivot axis as a center.

4. In an electrical instrument: the combination of a bar of permanent-magnet material having a magnetic axis lengthwise thereof and pivoted on a transverse axis which is substantially in the longitudinal medial plane of the bar and offset towards one end portion thereof; a relatively-stationary cylindrical shield surrounding said bar and having its central axis at said pivot axis; a shoe of non-permanent magnetic material secured to said one end portion of said bar and having its length dimension transverse to the bar, the length of said shoe being substantially greater than the width of said bar, and said shoe having a flux-radiating surface lengthwise thereof which confronts said shield and is at greater distance from said shield at the center than at the ends thereof; and a pair of field coils, interposed between said bar and said shield with their axes substantially normal to said pivot axis, for producing flux fields superimposed upon the flux field of said bar to exert a torque influence on the bar relative to said shield.

5. The subject matter set forth in claim 4 wherein said shoe comprises a thin metal strip held to the end face of said one end portion of said bar in symmetrical relation to said medial plane, and said strip has diverging intermediate portions extending angularly from said end face towards said shield and substantially arcuate terminal portions on a circle concentric with said shield.

6. The subject matter set forth in claim 4 wherein said shoe comprises a metal strip held to the end face of said one end portion of said bar in symmetrical relation to said medial plane, said strip being concave as viewed from said bar and the radius of curvature of said strip being greater than the radial length of said one end portion of said bar relative to said pivot axis whereby the terminal portions of the strip are closer to said shield than is the central portion thereof.

7. In an electrical instrument: the combination of a bar of permanent-magnet material pivoted on an axis transverse thereto and in substantially the longitudinal medial plane of the bar; a flat shield member of non-permanent magnetic material at right angles to said pivot axis and spaced from said bar, said shield member serving to conduct useful flux from the pole end portions of said bar; and a shoe of non-permanent magnetic material secured to a pole end portion of said bar in transverse relation thereto, said shoe being substantially symmetrical with respect to said medial plane and the end portions of said shoe being substantially closer to said shield member than is the central portion thereof.

8. In a ratiometer having a central axis, a magnetic shield symmetrical to said axis, a pair of field coils offset from said axis and adjacent to said shield and means for passing currents of different ratios through said coils: a permanent-magnet rotor comprising a bar of permanent-magnet material pivoted at said axis and transverse thereto; and a shoe of non-permanent magnet material secured at its central portion to a pole end portion of said bar in transverse relation to the bar, said shoe being substantially symmetrical with respect to a medial plane lengthwise through said magnet and said pivot axis and being substantially longer than the width of said bar, and said shoe having a surface for radiating flux through the electromagnetic field of said coils to said shield, the central portion of said flux-radiating surface being spaced farther from said shield than are the end portions thereof.

GEORGE H. FRITZINGER.

REFERENCES CITED

The following references are of record in the file of this patent:

UNITED STATES PATENTS

| Number | Name | Date |
|---|---|---|
| 1,719,556 | McCoy | July 2, 1929 |
| 1,742,697 | Eshbaugh | Jan. 7, 1930 |
| 1,743,470 | Mead | Jan. 14, 1930 |
| 1,832,583 | Roberts et al. | Nov. 17, 1931 |
| 2,179,952 | Pignolet | Nov. 14, 1939 |
| 2,189,524 | Randolph et al. | Feb. 6, 1940 |

FOREIGN PATENTS

| Number | Country | Date |
|---|---|---|
| 541,871 | Great Britain | Dec. 16, 1941 |